UNITED STATES PATENT OFFICE.

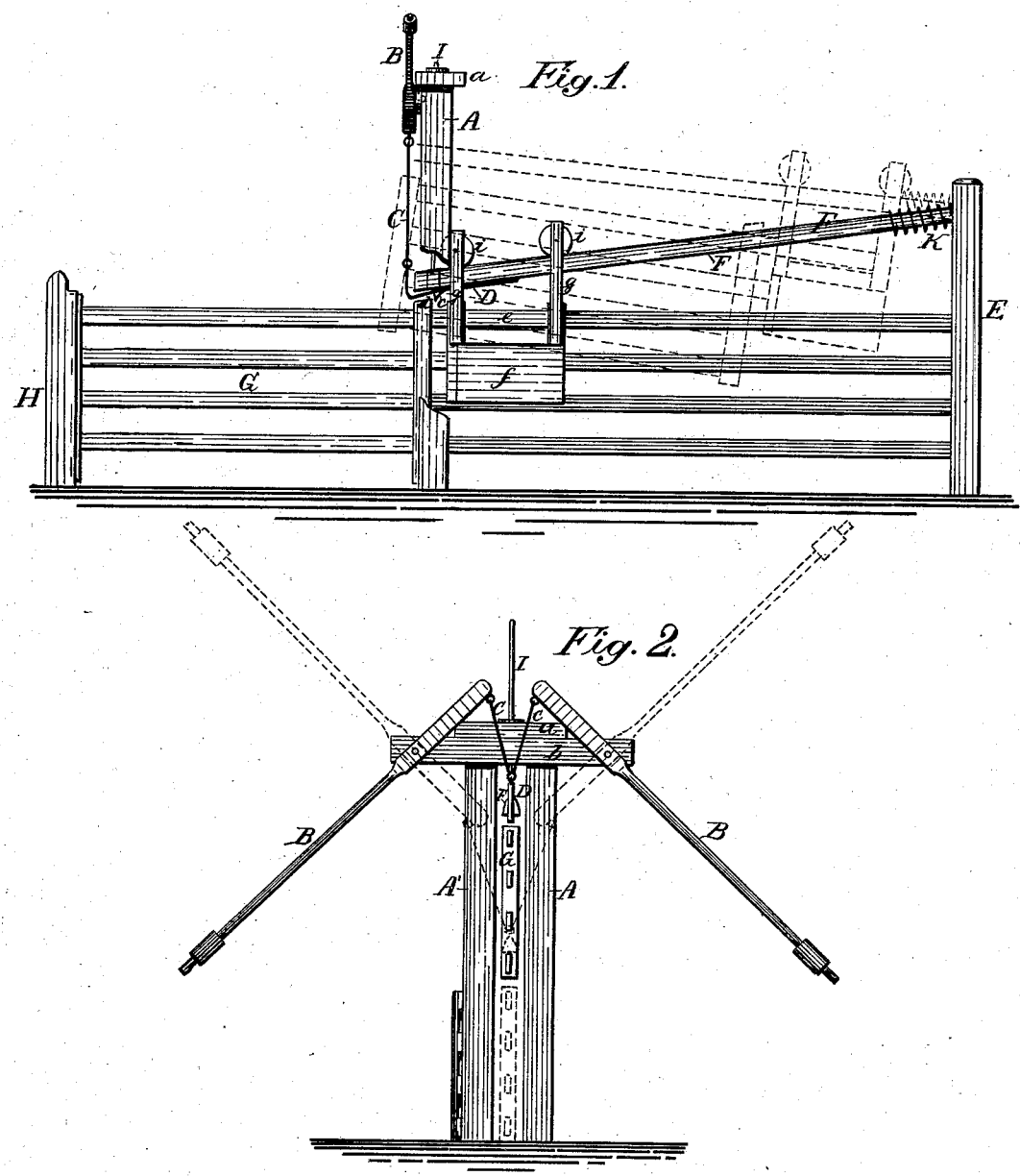

FREDERICK RAU, OF ALBIA, IOWA.

IMPROVEMENT IN GATES.

Specification forming part of Letters Patent No. 192,009, dated June 12, 1877; application filed March 20, 1877.

*To all whom it may concern:*

Be it known that I, FREDERICK RAU, of Albia, in the county of Monroe and State of Iowa, have invented certain new and useful Improvements in Gates; and I do hereby declare that the following is a full, clear, and exact description thereof, which will enable others skilled in the art to which it appertains to make and use the same, reference being had to the accompanying drawing, which form a part of this specification, and in which—

Figure 1 is a side elevation, part of the post being broken away; and Fig. 2 is an end view.

Similar letters of reference indicate corresponding parts in both the figures.

This invention relates to that class of gates which roll or slide upon an inclined bar operated by levers, arranged for the convenience of persons riding in carriages or on horseback, who may thus open or close the gate without dismounting; and it consists in the construction and combination of parts hereinafter more fully shown and specified.

In the drawing, A A' are the two posts between which the gate slides. They are united at the top by a cap-piece, a, and a bracket, b, to the ends of which the operating-levers B B are pivoted. C C are rods extending down from the ends of levers B B to a bent metallic spring, D, attached to the under side of a bar, F, pivoted in a post, E, at a suitable distance from posts A A'. The bar F, upon which the gate rolls or slides, extends in between posts A A', as shown. G is the gate, which, when closed, rests between posts A A' and H, the latter of which is planted on the side of posts A A' opposite to post E. The uppermost of the bars of which the gate is constructed is longer than the rest, its projection forming a bracket, e, to which is secured a block, f, of wood or metal, for the purpose of balancing the gate. g g are bails secured to bracket e, and having casters i i. By these bails the gate is suspended upon the pivoted bar F.

The under side of the spring D secured to the end of bar F has a catch, c, which engages with a projection, d, on top of the upper gate-bar, thus keeping the gate in position, when closed, until it is operated by the operating-levers. K is a coiled spring wound around the end of the pivoted bar F and resting against the post E. This spring serves as a buffer when the gate is opened to prevent injury from the jar. I is a guide-rod pivoted to the end of bar F, and passing through a perforation in the cap-piece a. The object of this is to steady the motion of the gate when operated.

When the gate is closed the bar F inclines from its pivoting-point, in post E, down toward the posts A A', between which and the post H the gate is disposed. The catches c d on the spring D, and upon the upper bar of the gate, engage with each other, and prevent the gate from being opened, except by the levers B B. When either of these is operated the spring D is lifted, so as to disengage catch c from projection d. The bar F is lifted from its downward incline, so as to incline toward its pivoting-point, and the gate consequently rolls or slides aside until it rests against the buffer-spring K. In this position the gate remains until the end of either of the levers B is raised, thus returning the bar F to its downward incline, and causing the gate to roll back to its former position.

Having thus described my invention, I claim and desire to secure by Letters Patent of the United States—

The sliding gate G, having catch or projection d, in combination with the pivoted bar F having bent spring D, provided with the catch c, substantially as and for the purpose herein set forth.

In testimony that I claim the foregoing as my own I have hereto affixed my signature in presence of two witnesses.

FREDERICK RAU.

Witnesses:
 BENJAMIN F. YOCUM,
 WILLIAM W. O'BRYSEN.